US 008726144B2

(12) United States Patent
Chidlovskii et al.

(10) Patent No.: US 8,726,144 B2
(45) Date of Patent: May 13, 2014

(54) INTERACTIVE LEARNING-BASED DOCUMENT ANNOTATION

(75) Inventors: Boris Chidlovskii, Meylan (FR); Thierry Jacquin, Gieres (FR)

(73) Assignee: Xerox Corporation, Norwalk, CT (US)

( * ) Notice: Subject to any disclaimer, the term of this patent is extended or adjusted under 35 U.S.C. 154(b) by 2759 days.

(21) Appl. No.: 11/316,771

(22) Filed: Dec. 23, 2005

(65) Prior Publication Data

US 2007/0150801 A1   Jun. 28, 2007

(51) Int. Cl.
*G06F 17/24* (2006.01)

(52) U.S. Cl.
USPC .......................................................... 715/231

(58) Field of Classification Search
CPC .................................................... G06F 17/241
USPC .................................................. 715/231, 241
See application file for complete search history.

(56) References Cited

U.S. PATENT DOCUMENTS

| | | | | |
|---|---|---|---|---|
| 5,404,295 A * | 4/1995 | Katz et al. | .......................... | 707/2 |
| 5,469,530 A * | 11/1995 | Makram-Ebeid | ............... | 706/25 |
| 5,671,333 A * | 9/1997 | Catlett et al. | ..................... | 706/12 |
| 5,675,710 A * | 10/1997 | Lewis | .............................. | 706/12 |
| 5,870,729 A * | 2/1999 | Yoda | ................................ | 706/26 |
| 6,516,305 B1 * | 2/2003 | Fraser | ................................ | 706/8 |
| 6,523,017 B1 * | 2/2003 | Lewis et al. | ...................... | 706/12 |
| 6,539,376 B1 * | 3/2003 | Sundaresan et al. | ................ | 707/5 |
| 6,553,365 B1 * | 4/2003 | Summerlin et al. | .......... | 707/740 |
| 6,556,982 B1 * | 4/2003 | McGaffey et al. | ............. | 706/50 |
| 6,804,684 B2 * | 10/2004 | Stubler et al. | ............. | 707/104.1 |
| 7,062,498 B2 * | 6/2006 | Al-Kofahi et al. | .................... | 1/1 |
| 2002/0105532 A1 * | 8/2002 | Oblinger | ........................ | 345/701 |
| 2003/0101194 A1 * | 5/2003 | Rys et al. | ....................... | 707/101 |
| 2003/0101415 A1 * | 5/2003 | Chang | ............................ | 715/513 |
| 2003/0115548 A1 * | 6/2003 | Melgar | .......................... | 715/513 |
| 2003/0140311 A1 * | 7/2003 | Lemon et al. | .................. | 715/513 |
| 2003/0182304 A1 * | 9/2003 | Summerlin et al. | ........... | 707/102 |
| 2003/0233369 A1 * | 12/2003 | Sassano | ........................ | 707/102 |
| 2004/0068479 A1 * | 4/2004 | Wolfson et al. | .................... | 707/1 |
| 2004/0088332 A1 * | 5/2004 | Lee et al. | ....................... | 707/200 |
| 2004/0172593 A1 * | 9/2004 | Wong et al. | .................... | 715/512 |
| 2004/0205482 A1 * | 10/2004 | Basu et al. | ................. | 715/500.1 |
| 2004/0230572 A1 * | 11/2004 | Omoigui | ........................... | 707/3 |
| 2004/0243645 A1 * | 12/2004 | Broder et al. | ................. | 707/200 |
| 2005/0021357 A1 * | 1/2005 | Schuetze et al. | ................... | 705/1 |
| 2005/0027664 A1 * | 2/2005 | Johnson et al. | .................. | 706/12 |

(Continued)

OTHER PUBLICATIONS

Chakrabarti et al., Fast and Accurate Text Classification via Multiple Linear Discriminant Projections, Jul. 21, 2003, The VLDB Journal (2003) vol. 12, pp. 170-174.*

(Continued)

*Primary Examiner* — Frank D Mills
(74) *Attorney, Agent, or Firm* — Fay Sharpe LLP

(57) ABSTRACT

A document annotation system includes a graphical user interface used by an annotator to annotate documents. An active learning component trains an annotation model and proposes annotations to documents based on the annotation model. A request handler conveys annotation requests from the graphical user interface to the active learning component, conveys proposed annotations from the active learning component to the graphical user interface, and selectably conveys evaluation requests from the graphical user interface to a domain expert. During annotation, at least some low probability proposed annotations are presented to the annotator by the graphical user interface. The presented low probability proposed annotations enhance training of the annotation model by the active learning component.

11 Claims, 2 Drawing Sheets

(56) References Cited

U.S. PATENT DOCUMENTS

2005/0114758 A1* 5/2005 Lang et al. .................... 715/512
2005/0154686 A1* 7/2005 Corston et al. ................. 706/12
2005/0177578 A1* 8/2005 Chen et al. .................... 707/100
2008/0319929 A1* 12/2008 Kaplan et al. .................. 706/14

OTHER PUBLICATIONS

Huang et al., Using a Web-Based Categorization Approach to Generate Thematic Metadata from Texts, Sep. 2004, ACM Transactions on Asian Language Information Processing, vol. 3. No. 3, pp. 190-212.*
Hu et al., Schema-Guided Wrapper Maintenance for Web-Data Extraction, Nov. 7, 2003, ACM WIDM' 03, pp. 1-8.*
Tong et al., Support Vector Machine Active Learning with Applications to Text Classification, Nov. 2001, Journal of Machine Learning Research (2001), pp. 45-66.*
Jin et al., Effective Automatic Image Annotation Via a Coherent Language Model and Active Learning, ACM, MM'04, New York, NY, Oct. 10-16, 2004, p. 892-899.*
Sychay et al., Effective Image Annotation Via Actuve Learning, IEEE, ICME '02, 2002, vol. 1, p. 209-212.*
Chinese Philosophy, "Yin and Yang", pp. 3, Richard Hooker, at http://www.wsu.edu:808/~dee/CHPHIL/YINYANG.HTM, (1996).
CambridgeDocs XML Backbone, "Cambridge DOCS Technology Platform," 5 pp, http://www.cambridgedocs.com/products_xmlbackbone.htm, last visited Nov. 17, 2005.
Exegenix, "ECS Engine," 1p, Exegenix Canada Inc., at http://exegenix.com/technology/ecs_engine.html, (2005).
Adobe Acrobat, 3 pp, Adobe Systems Incorporated, at http://www.adobe.com/products/acrobat/, (2005).
Amaya Home Pate, "Welcome to Amaya," at http://www.w3.org/Amaya/, 2 pp, (1994-2005).
Thompson et al., "Active Learning for Ntural Language Parsing and Information Extraction," Proceedings of the Sixteenth International Machine Learning Conference, pp. 406-414, Bled, Slovenia, (1999).
McCallum et al., "Employing EM and Pool-Based Active Learning for Text Classification," Proc. 15$^{th}$ Int. Conf. on Machine Learning, Morgan Kaufmann, San Francisco, CA, pp. 350-358, (1998).
U.S. Appl. No. 11/170,542, filed Jun. 2005, Chidlovskii et al.

* cited by examiner

INTERACTIVE LEARNING-BASED DOCUMENT ANNOTATION

CROSS REFERENCE TO RELATED PATENTS AND APPLICATIONS

The following U.S. patent application, relating generally at least to aspects of employing grammar-based parsing to perform document annotation, is commonly assigned with the present application, and is incorporated herein by reference:

Chidlovskii et al., "Probabilistic Learning Method for XML Annotation of Documents," U.S. patent application Ser. No. 11/170,542 filed 29 Jun. 2005 is incorporated by reference herein in its entirety.

BACKGROUND

The following relates to the information processing arts. It is described with example reference to conversion of legacy documents into extensible markup language (XML), hypertext markup language (HTML), or another structured format and annotation of the converted documents. However, the following is amenable to annotation of documents in various formats including but not limited to XML, standard generalized markup language (SGML), HTML, or so forth, and to annotating documents originally created in either an unstructured or substantially unstructured format such as portable document format (PDF), text, PostScript, or so forth or a structured format such as XML or HTML, and to other like applications.

Documents are created in various formats such as PDF, text, PostScript, word processing formats, scanned document images processed by optical character recognition (OCR), and so forth. There is substantial interest in migrating documents into databases or knowledge bases built around structured documents that facilitate searching, collating related data, and other types of data mining. Typically, the migration of documents involves conversion to a common structured document format such as XML, followed by annotation of the structured document. Off-the-shelf converters exist for converting documents in PDF, PostScript, Microsoft® Word (available from Microsoft Corporation, Redmond, Wash., USA), and other common document formats into shallow XML including limited structure, such as for example defining each physical line or sentence of text as a leaf of the shallow XML document. Annotation is then used to convert the shallow XML formatted document into a more structured format. The annotation process typically assumes a target (generally richer and well structured) document model which serves as an annotation model. For example, the annotation model may include a target XML schema, and the document annotation may involve identifying or aligning portions of the document with elements of the target XML schema. The annotation typically adds structure to the document along with semantic tags for the various structures. The tags can be used to index the document, provide labeled shortcuts for accessing structures within the document, facilitate document searching, can serve as document keywords in a database or knowledge base containing the document, and so forth.

The annotation process can be performed manually; however, manual annotation is difficult and time-consuming, and may be impractical when the number of legacy documents is large. As an alternative, machine learning can be employed to infer an annotation model from a set of pre-annotated training documents. The inferred annotation model is then used to annotate other, initially unannotated documents under the review of a human annotator.

Such machine learning approaches are predicated upon providing a sufficiently accurate and sufficiently large set of pre-annotated training documents so as to train an accurate annotation model for use in subsequent document annotating. Unfortunately, acquiring a suitable set of pre-annotated training documents can be difficult, and uncertainty may exist as to whether an available set of pre-annotated training documents is accurate and comprehensive enough to train an accurate annotation model. These difficulties are magnified when the subject matter of the documents to be annotated is technical or lies within a narrow field of knowledge. In such cases, there may be no specialized corpora corresponding to the documents from which a suitable training set may be derived.

Another problem with such machine learning approaches is that that the annotation model does not evolve. As time goes by, subject matter in a given field of knowledge evolves. For example, in the electronics field, terms such as "vacuum tube" and "relay" have been falling out of use, while terms such as "microprocessor" and "silicon-controlled rectifier" have become more commonly used. As the field of knowledge evolves, the annotation model becomes increasingly out-of-date.

BRIEF DESCRIPTION

According to certain aspects illustrated herein, a document annotation system is disclosed, including a graphical user interface for annotating documents, an active learning component for training an annotation model and for proposing annotations to documents based on the annotation model, and a request handler for conveying annotation requests from the graphical user interface to the active learning component and for conveying proposed annotations from the active learning component to the graphical user interface.

According to certain aspects illustrated herein, a document annotation method is disclosed, comprising: (i) annotating initially unannotated documents, the annotating including applying an active learning component to propose annotations based on an annotation model and accepting or rejecting the proposed annotations via a graphical user interface; (ii) training the annotation model by applying the active learning component to train or update training of the annotation model based on previous annotations generated by the annotating (i); and (iii) alternating between the annotating (i) and the training (ii) to concurrently train the annotation model and annotate the initially unannotated documents.

According to certain aspects illustrated herein, a document annotation system is disclosed. A graphical user interface is provided for accepting or rejecting proposed document annotations. An active learning component is provided for training an annotation model and for generating proposed document annotations based on the annotation model. A request handler is provided for (i) constructing evaluation requests including at least proposed document annotations and corresponding documents or links to corresponding documents, and (ii) conveying said evaluation requests to a human domain expert via an automated messaging pathway.

DETAILED DESCRIPTION

Figure 1:
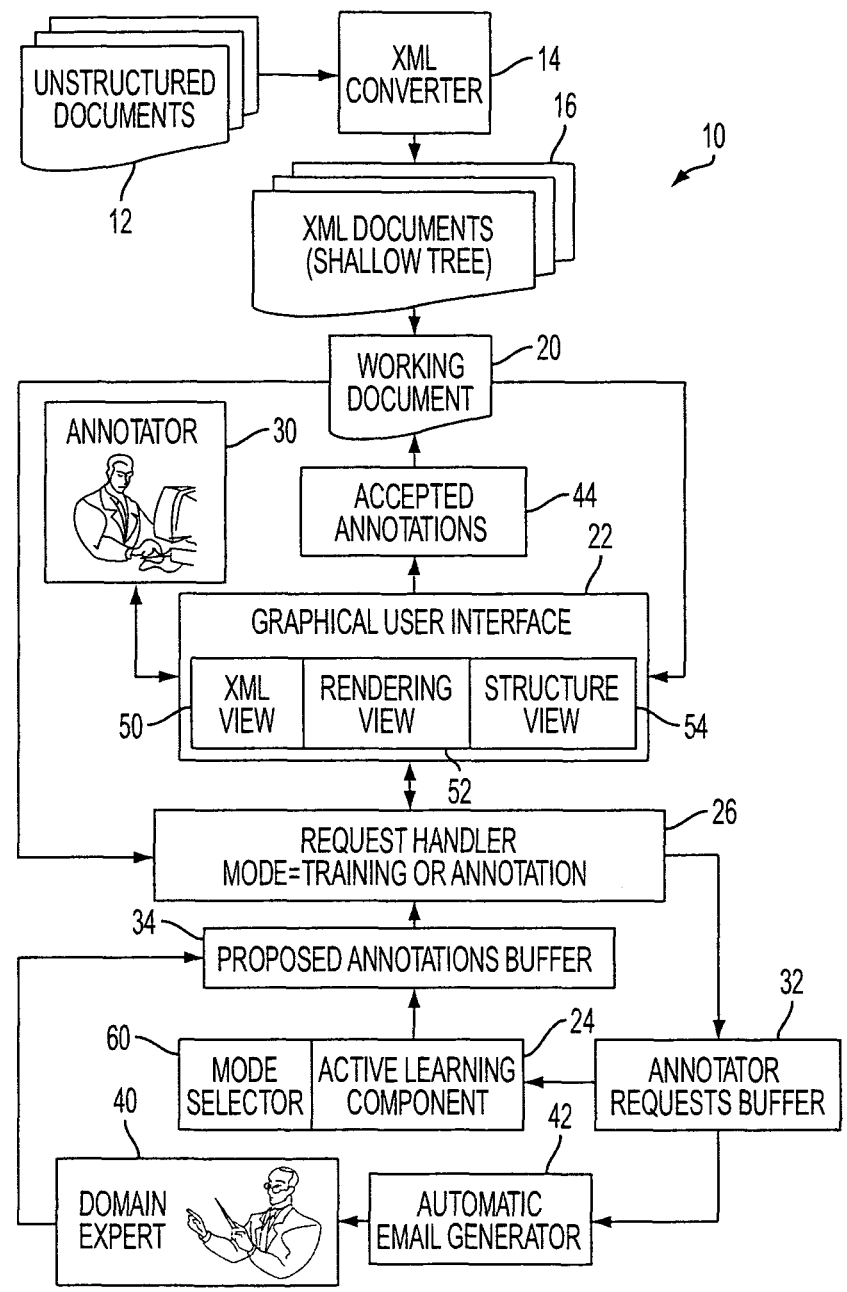
FIG. 1 diagrammatically depicts a document annotation system including an embedded active learning component.

With reference to FIG. 1, a document annotation system 10 receives documents 12 for annotation. In FIG. 1, the documents 12 are unstructured documents, for example in PDF, PostScript, Microsoft Word, or another substantially unstructured format. The documents 12 are initially processed by an XML converter 14 to generate corresponding documents 16 in an XML format having shallow structuring, such as a structure in which each sentence or physical line of text corresponds to a leaf of the XML document. In some embodiments, the received documents may already be in XML format, in which case the XML converter 14 is suitably omitted. While the illustrated embodiment employs shallow XML formatted documents 16, in other embodiments the annotator may operate on documents 16 which are in another structured format besides XML, such as on documents in HTML, SGML, or another structured format. For example, HTML may be an advantageous format for the documents 16 because HTML-formatted documents are readily loaded into and processed by graphical user interfaces of the types typically used in annotation. In contrast, some graphical user interfaces may invoke a rendering script or other pre-processing in order to load and process shallow XML documents. A working document 20 is selected for annotation from the set of shallow XML formatted documents 16. While a single example working document 20 is illustrated in FIG. 1, in practice the document annotation system 10 may be capable of concurrently annotating more than one working document.

The annotation system 10 includes three primary components: (i) a graphical user interface 22; an embedded active learning component 24; and a request handler 26 that operates based on an interaction protocol to interface the graphical user interface 22 and the active learning component 24. A human annotator 30 interacts with the graphical user interface 22 to pilot the annotation process. Requests for proposed annotations are submitted by the annotator 30 via the graphical user interface 22. The request handler 26 formats each annotation request and buffers the annotation request in an annotation requests buffer 32, and additionally buffers proposed annotations generated by the active learning component 24 in a proposed annotations buffer 34. By maintaining annotation requests and proposed annotations as persistent buffered objects until acted upon by the target component (that is, the active learning component 24 for buffered annotation requests, and the graphical user interface 22 for buffered proposed annotations), the active learning component 24 and the graphical user interface can operate substantially asynchronously from one another.

The human annotator 30 reviews and accepts or rejects proposed annotations via the graphical user interface 22. In some cases, the human annotator 30 may be unable to decide whether to accept or reject a proposed annotation. This situation may arise when, for example, the subject matter of the working document 20 (or the portion thereof being annotated) is highly technical, complex, relates to an esoteric subject, or is otherwise outside the ken of the annotator 30.

In such cases, the annotator 30 can send an evaluation request to the request handler 26 asking for the input of a human domain expert 40 who is an expert in the subject matter domain to which the working document 20 pertains. The evaluation request typically includes the proposed annotation and the working document 20 or a link to the working document 20, such as a uniform resource locator (URL) link to the working document 20. In some embodiments, the request handler 26 formats the evaluation request to include a rendered view in which the proposed document annotation is embedded in the working document 20. Such a "what-you-see-is-what-you-get" or WYSIWYG formatting of the evaluation request can be advantageous since the domain expert 40 may be unfamiliar with the annotation process and underlying annotation aspects such as XML and document structuring. The request handler 26 conveys the evaluation request to the human domain expert 40 via an asynchronous automated messaging pathway. In example FIG. 1, the automated messaging pathway is an email system, and the request handler 26 includes an automated email message generator 42 that generates an email addressed to the domain expert 40 and having content including at least the proposed annotation and the working document 20 or a link to the document 20. In other embodiments, the automated messaging pathway may include a document management system, and the evaluation request may be presented to the domain expert 40 as a workflow, document upload notification, or so forth. Using an asynchronous automated messaging pathway has the advantage that the annotator 30 can send the evaluation request, and the domain expert 40 can reply, at the annotator's and domain expert's convenience. However, it is also contemplated to employ a synchronous automated messaging pathway such as real-time video conferencing.

Although a single example human domain expert 40 is illustrated in FIG. 1, it will be appreciated that the annotator 30 may have asynchronous automated access via the request handler 26 to one, two, three, or more human domain experts, with different domain experts generally having expertise in different fields or sub-fields of knowledge (although there may be substantial overlap or duplication in expertise between various domain experts). The annotator 30 suitably directs each evaluation request to a domain expert having expertise relating to the proposed annotation and the working document 20 or relevant portion thereof. In some embodiments, the graphical user interface 22 may provide the annotator 30 with a list of available domain experts and an indication of the area or areas of expertise of each listed domain expert. The annotator 30 then selects a domain expert from the list.

The annotator 30 makes a decision as to whether to accept or reject the proposed annotation, optionally taking into account the response of the domain expert 40 to the optional evaluation request. Accepted annotations 44 are incorporated into the working document 20, while rejected annotations are not incorporated into the working document 20.

The active learning component 24 is also applied to train or update training of the annotation model based on previous annotations of the working document 20 or other similar documents previously annotated by the annotation system 10. This learning or annotation model training is suitably implemented by learning requests conveyed from the annotator 30 to the active learning component 24 via the request handler 26. The learning request asks the active learning component 24 to train or re-train the annotation model based on a training zone which may include, for example, the partially annotated working document 10, similar documents previously annotated by the annotation system 10, a most recently trained annotation model, a set of previously accepted or rejected proposed annotations to the working document 20 or previous documents, or so forth.

Having described the overall architecture of the example annotation system 10 illustrated in FIG. 1, some suitable example embodiments of the components and their interactions are now further set forth.

The graphical user interface 22 should provide the annotator 30 with multiple views of the working document 20 and the proposed and accepted annotations displayed on a display device viewed by the human annotator 30. In the illustrated example, the graphical user interface 22 includes: an XML view 50 which shows the source XML including markup tags; a rendering or WYSIWYG view 52 which shows the rendered document including the accepted annotations 44, with proposed (but not yet accepted or rejected) annotations selectably superimposed; and a structure view 54 which shows the document structure including annotation model. The structure view 54 may, for example, show a target XML schema embodying the annotation model in the form of a tree with labeled nodes and leaves, or in another graphical structure representation. The graphical user interface 22 provides adapted modes for the navigation amongst objects of interest to the annotator 30, such as: annotations and annotation propositions; the working document 20 and its document pages; requests to the active learning component 24; responses from the active learning component; and so forth. The graphical user interface 22 helps the annotator 30 compose requests that are conveyed to the active learning component 24 asynchronously by the request handler 26. The graphical user interface 22 visualizes proposed annotations by projecting or superimposing them on the rendering or WYSIWYG document view 52. The graphical user interface 22 also provides one or more input mechanisms, such as a pointing device (e.g., a mouse, trackball, or so forth), keyboard, or the like, for enabling the annotator 30 to accept or reject proposed annotations.

The graphical user interface 22 enables the annotator 30 to pilot the annotation process including training of the annotation model. The annotator 30 pilots the annotation model design through an operations sequence such as: training an annotation model from a given set of previous annotations or other annotation examples; applying the trained model to a given non-annotated document fragment; and evaluating the resulting proposed annotations, including accepting or rejecting each proposed annotation. In a suitable iterative approach, the annotator 30 requests that the active learning component 24 train the annotation model, using previous annotations available in a selected training zone, and then it applies the trained model to a selected application zone to create proposed annotations for document content in the application zone. The proposed annotations are evaluated, and accepted annotations 44 are optionally added to the training zone on a next iteration of the annotation process, thus allowing the active learning component 24 to re-train the annotation model and apply the annotation model to new application zones.

Advantageously, the active learning component 24 trains the annotation model during the annotation process based on previous proposed annotations accepted or rejected by the annotator 30, optionally in automated consultation with the domain expert 40. Accordingly, an accurate and comprehensive set of training documents is not employed; rather, the annotation model is created and refined using the initially unannotated documents 16 and accept-or-reject decisions ultimately made by the annotator 30 in optional automated consultation with the domain expert 40. The training of the annotation model during the annotation process also ensures that as-time goes by the annotation model continues to reflect the state-of-the-art in the technology of other field of knowledge to which the documents pertain. For example, newly developed terminology for describing new devices, new concepts, or other new developments in the field are incorporated into the training of the model as the annotator 30 annotates documents containing the newly developed terminology.

The active learning component 24 in some suitable embodiments employs a probabilistic classifier that probabilistically classifies unannotated document elements respective to classes corresponding to annotations. The probabilistic active learning component 24 outputs a probability of acceptance associated with each proposed annotation computed based on the probability of the classification. In some suitable embodiments, for example, the probabilistic classifier is selected from a group consisting of: a k-nearest neighbor classifier, a maximum entropy classifier, and an assembly method classifier. Active learning refers to a framework in which the learning algorithm selects the instances to be labeled and then used for further training of the model. By training based on previous annotations, the amount of a priori training data used in developing an accurate annotation model is reduced or eliminated. Thus, a comprehensive corpus of pre-annotated training documents is not used in training the model. Instead of annotating random documents and document elements to produce a comprehensive training set, active learning during the annotation process suggests to annotate instances that are expected to substantially benefit the learning method.

In some suitable approaches, the active learning principle of uncertainty based sampling is employed by the active learning component 24. Uncertainty based sampling is based on measuring the learner confidence on unlabelled instances. According to this principle, the classifier typically benefits more from labeling and including instances on which it is more uncertain or less confident when attempting to classify them. Uncertainty sampling reasons using probabilities $P(y_i|x)$ assigned by the probabilistic classifier to every class $y_i$ on each unlabelled observation x. The classes $y_i$ correspond to possible annotations, while the unlabeled observations x correspond to unlabeled elements of the working document 20.

Various confidence metrics can be employed for implementing the uncertainty based sampling. An example difference metric is defined as follows:

$$\text{conf\_diff}(x) = f_1(x) - f_2(x) \qquad (1),$$

where $f_i(x)$ is the i-top probability in the distribution $P(y_i|x)$. An example product metric is defined as follows:

$$\text{conf\_prod}(x) = \Pi_i P(y_i|x) \qquad (2).$$

An example maximum entropy confidence metric is defined as follows:

$$\text{conf\_me}(x) = \Sigma_i P(y_i|x) \cdot \log P(y_i|x) \qquad (3).$$

The confidence values returned by the metrics of Equations (1)-(3) are suitably interpreted as follows. The difference metric of Equation (1) always yields positive values, and smaller positive values indicate a higher uncertainty. The product metric of Equation (2) yields positive values as well, but in this case smaller metric values correspond to higher confidence. The maximum entropy metric of Equation (3) yields negative values; it approximates zero as the classifier becomes certain of its decision and returns low negative values for observations where the classifier is uncertain.

Once the confidence values are obtained according to a suitable metric for all observations x in the application zone, k observations are selected of the highest confidence denoted $x^H_i$ where the index i ranges between 1 and k. Similarly, m observations are selected of the least confidence, denoted $x^L_i$ where the index i ranges between 1 and m. One or both sets $x^H_i$ and $x^L_i$ are proposed to the annotator 30. As will be discussed, annotating using the high confidence proposed annotations $x^H_i$ tends to provide fast annotation of documents, but is relatively less effective at training the annotation model. On the other hand, annotating using the low confidence proposed annotations $x^L_i$ tends to enhance accuracy and speed of annotation model training, but slows down the document annotation process. Hence, there is a "Yin-and-Yang" type opposing utility of the high and low confidence proposed annotations $x^H_i$ and $x^L_i$.

High-confidence observations are proposed for annotation with the most confident class $y_i$ for the each $x^H_i$. Proposed annotations in the form $(x^H_i, y_i)$ are presented to the annotator 30, for example by projecting or superimposing the proposed annotation onto the document rendering view 52 along with an indication of the confidence level. The proposed annotations $x^H_i$ are proposals in which the active learning component 24 has a high degree of confidence; accordingly, acceptance of these highly confident proposed annotations is suitably made by the annotator 30 using a one-click operation or other simple user interface action. The proposed annotations $x^H_i$ of high confidence are optionally accepted or rejected as a unit. For example, the annotator 30 optionally can accept a class or set of proposed high confidence annotations $x^H_i$ that annotate a plurality of document elements using a single mouse click or other single user operation. In some embodiments, a threshold-based automatic annotation acceptance may be employed, in which all high-confidence observations $x^H_i$ in which the confidence is over a given threshold level are automatically accepted without visual verification or other intervention by the annotator 30.

On the other hand, the least-confident observations $x^L_i$ are suitably proposed in a different manner to the annotator 30, because these proposed annotations are of low confidence and should not be readily accepted by the annotator 30. For example, acceptance of each low confidence proposed annotation $x^L_i$ may require the annotator 30 to perform a mouse click (or multiple mouse clicks) or another user operation to accept the least-confident proposed annotation $x^L_i$.

Figure 2:
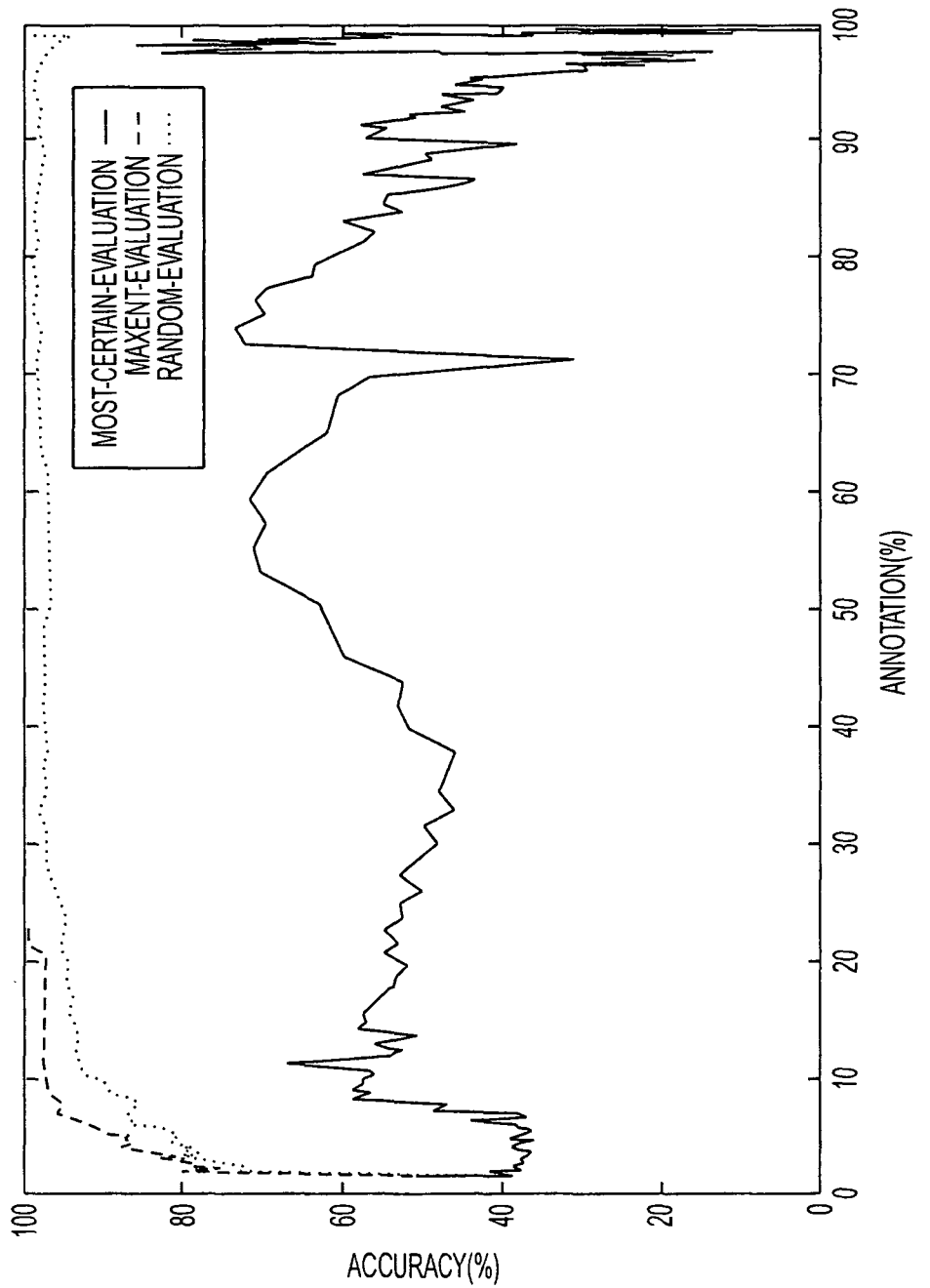
FIG. 2 plots the accuracy of proposed annotations produced by selected learning strategies optionally employed by the embedded active learning component of the document annotation system of FIG. 1.

With continuing reference to FIG. 1 and with further reference to FIG. 2, when the annotator 30 performs annotation by accepting or rejecting high confidence proposed annotations $X^H_i$, the annotation process is rapid. However, because the active learning component 24 is highly confident about these proposed annotations, subsequent training based on acceptance or rejection of the high confidence proposed annotations $x^H_i$ contributes little to developing the annotation model. Accordingly, when the annotator 30 performs annotation by accepting or rejecting high confidence proposed annotations $x^H_i$, training of the annotation model may stagnate. Model development by active learning based on previous annotation using the high confidence proposed annotations $x^H_i$ is illustrated in FIG. 2 as the "Most-certain evaluation" curve. Although this mode has low annotation cost, processing only most confident proposed annotations $x^H_i$ stunts development of the annotation model, and as seen in FIG. 2 the accuracy level of the annotation model is generally less than 80%.

In contrast, FIG. 2 also shows the performance of active learning with the maximum entropy (Maxent) confidence metric of Equation (3), which produces proposed annotations with substantially lower confidence. This metric performs well, rapidly producing a highly accurate model with limited training. However, the speed of annotation is slowed significantly, since now the annotator 30 can be expected to reject a large fraction of the proposed annotations. A third plot in FIG. 2 shows a random mode, in which proposed annotations are selected from both the high confidence set $x^H_i$ and from the low confidence set $x^L_i$. This approach provides a compromise between model development and rapid annotation, but is uncontrolled since the selection between the high confidence proposed annotations $x^H_i$ and the low confidence proposed annotations $x^L_i$ is random.

Based on the results of FIG. 2, in some embodiments the annotation system 10 includes a mode selector 60 that selects at least between (i) a training mode in which low probability proposed annotations $x^L_i$ are presented by the graphical user interface and (ii) an annotation mode in which high probability proposed annotations $x^H_i$ are presented by the graphical user interface. The mode selector 60 is switchable during a document annotation to switchably effectuate both (i) rapid training of the annotation model through presentation of low probability proposed annotations $x^L_i$ in the training mode (at the cost of slowed document annotation speed) and (ii) rapid annotation through presentation of high probability proposed annotations $x^H_i$ in the annotation mode (at the cost of possible stagnation of annotation model training).

The illustrated mode selector 60 operates in conjunction with the active learning component 24 such that the active learning component 24 outputs only the selected proposed annotations $x^L_i$ or $x^H_i$, so that only the output proposed annotations are presented by the graphical user interface 22. In other embodiments, the mode selector may operate in conjunction with other components. For example, the mode selector can operate directly in conjunction with the graphical user interface such that, although the graphical user interface receives both sets of proposed annotations $x^L_i$ and $x^H_i$, the graphical user interface 22 presents the annotator 30 with only the proposed annotation set $x^L_i$ or $x^H_i$ selected by the mode selector.

In the training mode, the annotator 30 prefers the model training to the annotation. The annotator 30 invests in training the annotation model by annotating the most uncertain elements using the low confidence proposed annotations $x^L_i$, thus increasing the accuracy of the trained model and the correctness of the model's predictions. The disadvantage is a lower speed of annotation as the annotator 30 rejects a large fraction of the low confidence proposed annotations $x^L_i$. Moreover, because these annotations are likely to be rejected, the process for accepting or rejecting the low confidence proposed annotations is optionally relatively complex—for example, each annotation may be accepted or rejected through a multiple click action by the annotator 30.

In the annotation mode, annotation prevails over training; it works with the most confident proposed annotations $x^H_i$. The associated annotation cost is minimal as the most certain propositions are often correct. Optionally, given the high confidence of these proposed annotations, the annotator 30 can accept or reject these high confidence annotations $x^H_i$ using a single mouse click, and optionally may accept the entire set of high confidence proposed annotations together using a single mouse click. This allows documents to be annotated quickly. However, the annotation mode is not efficient at improving the annotation model accuracy.

The training and annotation modes are complementary. A long period of document annotation using the training mode may be costly, and may provide little annotation model improvement once the model is substantially trained. On the other hand, operating in the annotation mode for a long period of time can exhaust the annotation model's capacity for making correct predictions. This suggests switching over to training mode to improve the annotation model. Thus, by alternating between the training and annotation modes, both model training and document annotation are achieved in an efficient manner. In a suitable approach, the annotation starts in the training mode. Once the rate of annotation model improvement levels off, the annotation system 10 is switched to the annotation mode to perform efficient document annotation. Annotation continues in the annotation mode until the proposed annotation acceptance rate begins to decrease, indicating that training should be re-enforced or revised. At that point, the annotation system 10 is switched back into training mode to re-train or adjust the annotation model. Switching of the mode selector 60 is in some embodiments suitably guided by the difference of average confidence values between high confidence proposed annotations $x^H_i$ and the low confidence proposed annotations $x^L_i$.

The request handler 26 enables the graphical user interface 22 and embedded active learning component 24 to operate asynchronously. The request handler 26 suitably provides a communication protocol between the graphical user interface 22 and embedded active learning component 24 that ensures data and control synchronization and supports the incremental and iterative annotation model design, and enhances fault tolerance and system maintenance. In some embodiments, the graphical user interface 22 can send at least three types of requests to the active learning component 24, including learning requests, annotation application requests, and combined learning/application requests. In learning requests, the active learning component 24 is asked to train the annotation model based on previous annotations available in the training zone. This is implemented, for example, through one or multiple learning requests to the active learning component 24. Annotation application requests ask the active learning component 24 to apply the trained annotation model to a given application zone, such as unannotated portions of the working document 20. Proposed annotations are buffered in the proposed annotations buffer 34 for consideration by the annotator 30. Combined learning/application requests ask the active learning component 24 to train the annotation model and immediately apply the trained annotation model the application zone.

The graphical user interface 22 and embedded active learning component 24 to operate asynchronously. However, in some cases some synchronization may be advantageous. Some synchronization requests may be raised by the active learning component 24. For example, progress in document sources and annotations at the graphical user interface 22 are suitably communicated to the active learning component 24 for training or re-training of the annotation model. Asynchronous requests from the annotator 30 conveyed from the graphical user interface 22 to the active learning component 24 via the request handler 26 typically ensure data and annotation synchronization. However, unanticipated events may cause partial or full mismatch between the components 22, 24. To remedy such a mismatch, the active learning component 24 optionally issues one or more synchronization requests to the graphical user interface 22. Upon such requests, the active learning component 24 will be supplied with the corresponding objects, either directly or by providing a URL for download of the working document 20 or other supplied object.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:

1. A document annotation system comprising:
a graphical user interface for annotating documents, the graphical user interface including at least one user input device and a display device configured to display documents;
a probabilistic active learning component configured to train an annotation model and to propose annotations to documents based on the annotation model, the probabilistic active learning component also outputting a probability of acceptance associated with each proposed annotation; and
a request handler configured to convey annotation requests from the graphical user interface to the active learning component and to convey proposed annotations from the active learning component to the graphical user interface, the request handler including a mode selector that selects at least between (i) a training mode in which low probability proposed annotations are presented by the graphical user interface and (ii) an annotation mode in which high probability proposed annotations are presented by the graphical user interface.

2. The document annotation system as set forth in claim 1, wherein the documents being annotated are one of (i) extensible markup language (XML) documents, the annotation model being a target XML schema, and (ii) hypertext markup language (HTML) documents.

3. The document annotation system as set forth in claim 1, wherein the mode selector is switchable during a document annotation to switchably effectuate both (i) rapid training of the annotation model through presentation of low probability proposed annotations in the training mode and (ii) rapid annotation through presentation of high probability proposed annotations in the annotation mode.

4. The document annotation system as set forth in claim 1, wherein (i) in the training mode the graphical user interface requires one or more user operations to make an annotation and (ii) in the annotation mode the graphical user interface requires a single user operation to annotate a plurality of elements.

5. The document annotation system as set forth in claim 1, wherein the probabilistic active learning component comprises
a probabilistic classifier that probabilistically classifies unannotated document elements respective to classes corresponding to annotations.

6. The document annotation system as set forth in claim 5, wherein the probabilistic classifier is selected from a group consisting of: a k-nearest neighbor classifier, a maximum entropy classifier, and an assembly method classifier.

7. The document annotation system as set forth in claim 1, wherein the request handler further conveys learning requests from the graphical user interface to the active learning component, each learning request using previously annotated documents or document portions for training of the annotation model.

8. A document annotation system comprising:
a graphical user interface for annotating documents, the graphical user interface including at least one user input device and a display device configured to display documents;
an active learning component for training an annotation model and for proposing annotations to documents based on the annotation model, the active learning component comprising a probabilistic active learning component that outputs a probability of acceptance associated with each proposed annotation; and an asynchronous request handler configured to convey annotation requests from the graphical user interface to the active learning component and to convey proposed annotations from the active learning component to the graphical user interface, the asynchronous request handler (i) buffering annotation requests conveyed from the graphical user interface to the active learning component and (ii) buffering proposed annotations to documents conveyed from the active learning component to the graphical user interface, wherein the asynchronous request handler comprises a mode selector that selects at least between (i) a training mode in which low probability proposed annotations are presented by the graphical user interface and (ii) an annotation mode in which high probability proposed annotations are presented by the graphical user interface.

9. The document annotation system as set forth in claim 8, wherein the asynchronous request handler further comprises:

a domain expert request handler for conveying evaluation requests from the graphical user interface to a human domain expert and for conveying responses from the human domain expert to the graphical user interface.

10. The document annotation system as set forth in claim 9, wherein the evaluation request conveyed by the domain expert request hander includes (i) at least one proposed annotation to a document generated by the active learning component and (ii) the document or a link to the document.

11. The document annotation system as set forth in claim 10, wherein the domain expert request handler comprises:

an automated email message generator that generates an email addressed to the domain expert and having content including at least (i) the at least one proposed annotation and (ii) the document or the link to the document.

* * * * *